(12) United States Patent
dos Santos et al.

(10) Patent No.: US 11,187,619 B2
(45) Date of Patent: Nov. 30, 2021

(54) METHOD AND APPARATUS FOR DETECTING VIBRATIONAL AND/OR ACOUSTIC TRANSFERS IN A MECHANICAL SYSTEM

(71) Applicant: SIEMENS INDUSTRY SOFTWARE NV, Leuven (BE)

(72) Inventors: Fabio Marques dos Santos, Leuven (BE); Peter Mas, Chassieu (FR)

(73) Assignee: SIEMENS INDUSTRY SOFTWARE NV, Leuven (BE)

( * ) Notice: Subject to any disclaimer, the term of this patent is extended or adjusted under 35 U.S.C. 154(b) by 0 days.

(21) Appl. No.: 17/058,640

(22) PCT Filed: May 30, 2018

(86) PCT No.: PCT/EP2018/064236
§ 371 (c)(1),
(2) Date: Nov. 24, 2020

(87) PCT Pub. No.: WO2019/228625
PCT Pub. Date: Dec. 5, 2019

(65) Prior Publication Data
US 2021/0208026 A1 Jul. 8, 2021

(51) Int. Cl.
*G01M 13/028* (2019.01)
*G01H 1/12* (2006.01)
(Continued)

(52) U.S. Cl.
CPC ............ *G01M 13/028* (2013.01); *G01H 1/12* (2013.01); *G06N 3/0445* (2013.01); *G06N 3/084* (2013.01)

(58) Field of Classification Search
CPC ......... G01M 13/028; G01H 1/00; G01H 1/12; G05B 13/027; G06N 3/0445; G06N 3/084;
(Continued)

(56) References Cited

U.S. PATENT DOCUMENTS

| 5,367,612 A | * | 11/1994 | Bozich | G01N 29/30 706/23 |
| 5,426,720 A | * | 6/1995 | Bozich | G01N 29/30 706/23 |

(Continued)

FOREIGN PATENT DOCUMENTS

EP 2113755 A1 11/2009

OTHER PUBLICATIONS

Snyder, Scott D. et al.; Active Control of Vibration Using a Neural Network; IEEE Transactions on Neural Networks, vol. 6, No. 4, Jul. 1995; pp. 819-828. (Year: 1995).*

(Continued)

*Primary Examiner* — Stanley K. Hill
(74) *Attorney, Agent, or Firm* — Lempia Summerfield Katz LLC

(57) ABSTRACT

Method and apparatus for detecting vibrational and/or acoustic transfers in a mechanical system A method and apparatus for detecting vibro-acoustic transfers in a mechanical system are provided. The method comprises: while operating the mechanical system, acquiring, at each of multiple input points, an input signal indicative of a mechanical load acting on the input point, and acquiring, at a response point, a response signal indicative of a mechanical response; training a neural network device using the input signals acquired at the input points and using the response signal acquired at the response point; and, for each of the input points: providing only the input signal acquired
(Continued)

at the respective input point to the trained neural network device and obtaining, from the neural network device, a contribution signal indicative of a predicted contribution of the respective input signal to the response signal. Vibro-acoustic transfers may be detected solely based on operational data, thereby reducing time and a cost for performing a transfer analysis.

14 Claims, 7 Drawing Sheets

(51) Int. Cl.
*G06N 3/04* (2006.01)
*G06N 3/08* (2006.01)

(58) Field of Classification Search
CPC .................. G10K 11/16; G10K 11/178; G10K 11/17821; G10K 11/1785; G10K 11/17854; G10K 11/17857; G21C 7/36; H04B 15/00
See application file for complete search history.

(56) References Cited

U.S. PATENT DOCUMENTS

| | | | |
|---|---|---|---|
| 5,434,783 A * | 7/1995 | Pal | G10K 11/17873 701/36 |
| 5,602,761 A | 2/1997 | Spoerre | |
| 5,995,910 A | 11/1999 | Discenzo | |
| 6,137,886 A * | 10/2000 | Shoureshi | F16F 15/002 381/71.2 |
| 6,601,054 B1 * | 7/2003 | Lo | G05B 5/01 706/30 |
| 2004/0030664 A1 * | 2/2004 | Kotoulas | F16F 15/02 706/22 |
| 2005/0149234 A1 | 7/2005 | Vian | |
| 2009/0276197 A1 * | 11/2009 | Janssens | G01H 17/00 703/2 |
| 2016/0343180 A1 | 11/2016 | Talwar | |

OTHER PUBLICATIONS

Montazeri, Allahyar et al.; Evaluating the Performance of a Non-linear Active Noise Control System in Enclosure; The 33rd Annual Conference of the IEEE Industrial Electronics Society (IECON) Nov. 5-8, 2007, Taipei, Taiwan; pp. 2484-2488. (Year: 2007).*
Kim, S. J. et al.; Prediction of Interior Noise By Excitation Force of the Powertrain Based on Hybrid Transfer Path Analysis; International Journal of Automotive Technology, vol. 9, No. 5, pp. 577-583 (2008). (Year: 2008).*
International Preliminary Report on Patentability for International Patent Application PCT/EP2018/064236 dated Aug. 31, 2020.
PCT International Search Report and Written Opinion of International Searching Authority dated Mar. 13, 2019 corresponding to PCT International Application No. PCT/EP2018/064236 filed May 30, 2018.

* cited by examiner

METHOD AND APPARATUS FOR DETECTING VIBRATIONAL AND/OR ACOUSTIC TRANSFERS IN A MECHANICAL SYSTEM

This application is the National Stage of International Application No. PCT/EP2018/064236, filed May 30, 2018, the entire contents of which are hereby incorporated herein by reference.

BACKGROUND

The present embodiments relate to the field of vibrational and/or acoustic analysis of mechanical systems, and, more particularly, to a method and apparatus for detecting vibrational and/or acoustic transfers in a mechanical system.

In a mechanical system such as an automobile, sensations such as noise, vibration, and harshness (NVH) may be experienced by an observer at a receiver location, such as a driver or passenger seat. In vehicle engineering, there is a need to identify excitation sources contributing to the experienced NVH.

Transfer path analysis (TPA) is a known method for tracing transfers of vibro-acoustic energy from an excitation source, via a plurality of structure- and airborne transfer paths, to a receiver location. Performing TPA typically includes acquiring mechanical loads acting on the mechanical system during an operational test and estimating a plurality of system response functions (SRF) characterizing the plurality of transfer paths. The SRFs may be estimated in an excitation test. An excitation test may be a time-consuming procedure, which may require disassembling the vehicle body and equipping the vehicle body with force sensors at interface locations between an active and a passive component thereof.

EP 2 113 755 A1 discloses a method for characterizing vibrational and/or acoustic transfer path related data of a physical system.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method and device capable of improving detection of vibrational and/or acoustic transfers in a mechanical system are provided. According to a first aspect, a method for detecting vibrational and/or acoustic transfers in a mechanical system including a plurality of mechanically interacting elements is provided. The method includes: a) while operating the mechanical system according to an operating pattern, acquiring, at each input point of a plurality of input points of the mechanical system, an input signal indicative of a mechanical load acting on the input point during operation, and acquiring, at a response point of the mechanical system, a response signal indicative of a mechanical response of the mechanical system at the response point; b) training a neural network device using the input signals acquired at the plurality of input points as training input data and using the response signal acquired at the response point as training output data; and, for each input point of the plurality of input points: c) providing only the input signal acquired at the respective input point to the trained neural network device; and d) obtaining, from the trained neural network device in response to only the input signal acquired at the respective input point being provided thereto, a contribution signal indicative of a predicted contribution of the input signal acquired at the respective input point to the response signal acquired at the response point.

The method may enable obtaining a prediction of the contributions of the mechanical loads acting on the input points to the response signal at the response point without estimating characterizing data of the mechanical system such as system transfer functions. An excitation testing may not be needed. Vibrational and/or acoustic transfers in the mechanical system may be detected solely based on operational data (e.g., input signals acquired during operation). The method may allow fast and cost-efficient detection of vibro-acoustic transfers in the mechanical system. Examples of the mechanical system including a plurality of mechanically interacting elements include a vehicle, an automobile, an airplane, and a piece of machinery.

Examples of the mechanically interacting elements include a vehicle body, a suspension, a strut tower, a tire, a motor, an engine, a cabin, a panel, a seat, a window, a hood, a door, various parts thereof, and the like.

The plurality of mechanically interacting elements may be coupled so as to interact via a plurality of structural and/or airborne transfer paths.

Operating the mechanical system may include operating a primary excitation source included in the mechanical system. The primary excitation source may be a motor, an engine, or the like.

For example, in the case of a vehicle, operating the mechanical system may refer to driving the vehicle on a road and/or operating the vehicle on a test stand.

An operating pattern may be a time sequence of operating parameters, such as power, rotations per minute, gear, and the like, to be supplied to the motor, the engine, a clutch, and the like to control operation of the mechanical system.

Operating the mechanical system may include exciting the mechanical system. For example, one or more of the mechanically interacting elements may be excited by the primary excitation source and/or by one or more secondary excitation sources.

A secondary excitation source may represent a source of excitations resulting from external mechanical interaction between one of the mechanically interacting elements of the mechanical system and an external element. Such external mechanical interaction may take place in response to the mechanical system being operated. An example for a secondary excitation source is a tire that externally interacts with a road (e.g., external element) in response to the vehicle being driven by the motor.

In response to the mechanical system being excited when the mechanical system is operated according to the operating pattern, mechanical loads may act on the mechanical system. The mechanical loads may be acoustic and/or vibrational mechanical loads.

The mechanical loads acting on the mechanical system may be transferred through the system along the plurality of transfer paths.

The vibrational and/or mechanical loads may be detected at the plurality of input points and at the response point using a plurality of sensors, such as an accelerometer, a microphone, a force sensor, a pressure gauge, a strain gauge and the like.

In one embodiment, each input point of the plurality of input points may be assigned to one element of a first plurality of the mechanically interacting elements at which the mechanical system is excited during operation.

In one embodiment, the response point may be assigned to one element of a second plurality of the mechanically interacting elements that responds to the loads transferred along the plurality of transfer paths when the mechanical system is excited during operation.

A respective of the input points and the response point may be assigned by placing a corresponding sensor at a respective of the mechanically interacting elements. When the mechanical system is a motor vehicle, examples of locations of the input points include locations at a motor bearing, at a wiper motor bracket, at a strut bearing, at an exhaust pipe bracket, and the like, and examples of locations of the response point include locations at a driver seat, at a passenger seat, at a head support, and the like.

A respective input signal and the response signal may each be a signal supplied by a respective of the sensors, such as an acceleration signal, such as an acoustic signal, and/or a vibrational signal, a force signal, a pressure signal, a strain signal, and the like.

A respective signal, such as a respective input signal and the response signal, may each be acquired as a sequence of readings. A respective reading may be a vibrational and/or acoustic frequency value, a force value, a pressure value, a strain value, or the like.

In a respective signal, a respective reading may be associated with one or more parameters. The one or more parameters may include a time. The one or more parameters may include an operating parameter of the operating pattern used during operation when the respective reading was acquired.

In other words, a respective signal may be a signal in time domain, in rotations per minute domain, or the like.

The neural network device may be configured to implement a neural network having machine learning ability and/or artificial intelligence. The neural network may include a plurality of artificial neurons. A number of artificial input neurons of the neural network may correspond to the number of input points. A number of artificial output neurons of the neural network may correspond to a number of response points. The number of artificial output neurons may be one or more.

For example, each input point of the mechanical system may be associated with a corresponding one of the input neurons of the neural network, and the response point of the mechanical system may be associated with the output neuron of the neural network.

The neural network device may be configured to perform machine learning by adapting an internal structure of the neural network in response to being trained. Training may include repeatedly providing training input data and training output data to the neural network device.

When trained, the neural network device may be configured to, in response to being provided with input data, provide output data based on information learned by the neural network device during training.

Herein, machine learning ability and/or artificial intelligence may refer to the fact that the neural network device, by being trained with a number of samples of input and output data, may acquire an ability to predict output data for input data that differs from the input data used during training.

Specifically, through training with a number of samples of the acquired plurality of input signals and the acquired response signal of the mechanical system, the neural network device may acquire an ability to predict a response signal for other pluralities of input signals (e.g., other combinations of the same input signals and/or combinations of other input signals).

Providing a respective signal as input data or training input data to the neural network device may refer to feeding readings included in the signal one after another to a corresponding one of the input neurons of the neural network implemented by the neural network device. Herein, a respective reading may be fed to the neuron together with an associated parameter, such as an operating parameter included in the signal in association with the respective reading. Obtaining a signal as output data from the trained neural network device may refer to reading readings from an output neutron of the neural network implemented by the neural network device and forming a signal from the plurality of readings obtained in this way.

Providing only the input signal acquired at one input point as input data to the trained neural network device may refer to providing the input signal to a corresponding one of the input neurons and providing no input signal, or providing a signal that is continuously zero, to any other input neurons of the neural network.

In other words, after having been trained on operational data in acts a) and b), in acts c) and d), the neural network device may be used to predict a behavior of the mechanical system when hypothetically excited by respective plurality of input signals including only one input signal acquired at a respective one input point of the plurality of input points.

In other words, the contribution signal may be a respective predicted response signal for a respective single input signal.

In other words, acts c) and d) may be described as performing a decomposition of the plurality of input signals into respective single input signals and determining a predicted response signal corresponding to a respective single input signal.

The method has been devised under an assumption that a predicted response signal corresponding to a hypothetical excitation by a single input signal of the plurality of input signals may also be indicative of a contribution that the single input signal has to an actual response signal when the mechanical system is excited by the plurality of input signals. A predicted contribution of a respective input signal to the response signal may also be referred to as a portion of the input signal that is transferred into the response signal.

Obtaining the contribution signal may therefore correspond to detecting vibrational and/or acoustic transfers in the mechanical system.

In other words, the method may be able to detect vibrational and/or acoustic transfers in the mechanical system based on operational data and machine learning, without requiring the mechanical system to be disassembled to determine system characterization data, without performing an excitation test, and without identifying transfer paths, estimating system transfer functions, and the like.

Thereby, vibrational and/or acoustic transfers of a prototype may be identified, and appropriate corrective measures may be taken.

For example, a vehicle design process may be accelerated, and cost may be reduced.

According to an embodiment, the method further includes: testing the trained neural network device by determining a sum of the plurality of contribution signals; subtracting the sum of the plurality of contribution signals from the response signal; determining that the neural network device is sufficiently trained when a result of the subtraction is less than a predetermined threshold; and otherwise, determining that the neural network device is not sufficiently trained.

Thereby, an accuracy of the method may be validated, and confidence in the determined contribution signals may be increased.

In response to determining that the neural network device is not sufficiently trained, act b) and/or acts a) and b) may be repeated until the neural network device is determined to be sufficiently trained.

Alternatively, in response to determining that the neural network device is not sufficiently trained, a warning message may be displayed or transmitted to an operator.

Optionally, in response to determining that the neural network device is not sufficiently trained, at least one of the neural network implemented by the neural network device, the plurality of input points, the operating pattern, and the like may be altered. Following the altering, acts a) and b) may be repeated.

Determining a sum of the plurality of contribution signals and subtracting the sum form the response signal may include adding and subtracting corresponding individual readings included in the respective signals.

Comparing the subtraction result (e.g., a signal) to a predetermined threshold (e.g., a scalar value) may refer to comparing a root-mean-square value, total energy content, or the like of the subtraction result to the predetermined threshold.

According to a further embodiment, the training in act b) is supervised training including: providing the training input data to the neural network device to obtain predicted output data; and adjusting weightings applied by respective neurons of the neural network device such as to reduce a deviation between the predicted output data and the training output data.

A neural network device may be trained using supervised training, reinforced training, or unsupervised training. However, supervised training according to the embodiment may have the advantage of being able to train the neural network device so as to gain artificial knowledge based on the acquired input signals and the acquired response signal.

According to a variant of the further embodiment, the training in acts b) may further include: providing the training output data to the neural network device to obtain predicted input data; and adjusting weightings applied by respective neurons of the neural network device such as to reduce a deviation between the predicted input data and the training input data.

In other words, the training of act b) may include a forward pass and a backward pass.

Supervised training using a forward pass and a backward pass may increase an accuracy of and confidence in the neural network device and the results of the method.

According to a further embodiment, act b) includes splitting the input signals and the response signal into a plurality of batches of predetermined length; and, for each of the batches, training the neural network device using respective portions of the input signals as the training input data and a respective portion of the response signal as the training output data.

A respective batch may include a plurality of corresponding portions of a respective of the signal.

The predetermined length may be shorter than a total length of a respective signal. Herein, "length" may refer to a number of readings comprised in a respective signal portion.

In one embodiment, and as a non-limiting example, the length may be between 100 and 1000 readings. A length of 100 may beneficially enable fast training. A length of 1000 readings may beneficially provide more accurate results. By dividing the input signals and the response signals into a plurality of batches with shorter length during training, a machine learning performance of the neural network device may be increased.

Subsequently providing all of the batches to the neural network device as training input data and training output data and performing a forward pass and a backward pass with each of the batches may also be referred to as an "epoch" of training.

According to embodiments, the training in act b) may include a number of epochs.

In other words, the training in act b) may be repeated a number of times.

The number of times or epochs may be a predetermined number of 1 or greater. In one embodiment, and as a non-limiting example, the number of epochs may be 1000.

Alternatively, the training in act b) may be repeated until an amount of change, between two subsequent epochs, of a deviation between the predicted output data and the training output data and/or an amount of change, between two subsequent epochs, of a deviation between the predicted input data and the training input data is less than a predetermined threshold.

In other words, training may be repeated until respective deviations converge. Thereby, the neural network device may be trained more reliably.

According to a further embodiment, the method further includes, while operating the mechanical system according to a second operating pattern different from the first operating pattern: acquiring, at each input point of the plurality of input points, a second input signal, and acquiring, at the response point of the mechanical system, a second response signal; and performing acts c) and d) using the second input signals as the input signals and the second response signal as the response signal.

Thereby, an artificial intelligence and/or machine learning capability of the neural network device may be beneficially leveraged to detect acoustic and/or vibrational transfers in the mechanical system also when operated in a manner that was not covered by the operating pattern used during training of the neural network device.

In other words, during evaluation of the mechanical system, initially, when acquiring operational data (e.g., input signals and response signal), the neural network device may be trained using the acquired operational data and may then be used to provide the respective predicted contributions of the input signals of the same operational data that has been used during training.

Once the neural network device has been trained, further operational data may be acquired, and the neural network device may be used to provide the respective predicted contributions of the input signals of the further operational data. Therein, further training according to act b) may not be necessary and may be omitted.

According to a second aspect, a method for detecting vibrational and/or acoustic transfers in a mechanical system including a plurality of mechanically interacting elements using a trained neural network device trained to perform detection of vibrational and/or acoustic transfers in the mechanical system is provided. The method includes: a') while operating the mechanical system according to an operating pattern, acquiring, at each input point of a plurality of input points of the mechanical system, an input signal indicative of a mechanical load acting on the input point during operation, and acquiring, at a response point of the mechanical system, a response signal indicative of a mechanical response of the mechanical system at the response point. The method further includes, for each input point of the plurality of input points: c) providing only the input signal acquired at the respective input point as input data to the trained neural network device; and d) obtaining, as output data from the trained neural network device in response to only the input signal acquired at the respective input point being provided thereto, a contribution signal indicative of a predicted contribution of the input signal acquired at the input point to the response signal acquired at the response point.

Whereas the first aspect relates to method of training and using a neural network device, the second aspect relates to using a previously trained neural network device to obtain the respective contribution signals.

The embodiments and features described with reference to the method of the first aspect apply mutatis mutandis to the method of the second aspect.

According to an embodiment of the first aspect or the second aspect, the method further includes generating and displaying a decomposition of the response signal into the predicted contributions of the input signals acquired at each input point of the plurality of input points.

The displayed decomposition may be a graphical representation of each of the contribution signals. By looking at the displayed decomposition, an engineer may easily identify a large contribution among the plurality of contributions, and therefrom, the engineer may understand which of the input points primarily contribute to the response signal. The engineer may use this information to undertake countermeasures to reduce the response signal and improve NVH properties of the mechanical system. According to a further embodiment of the first aspect or the second aspect, the method further includes: comparing the predicted contributions of the input signals acquired at each input point of the plurality of input points; identifying an input signal the predicted contribution of which is greatest among the plurality of predicted contributions; and altering the mechanical system at the input point at which the identified input signal has been acquired.

Altering the mechanical system at the input point may, for example, include increasing a stiffness of one or more of the mechanically interacting elements at the input point, arranging a damping element near the input point, arranging a noise and/or vibration cancelling source near the response point, and/or altering a design of the mechanical system.

The method may be used as a design aid in a design process of a mechanical system such as an automobile.

According to a further embodiment of the first aspect or the second aspect, the neural network device is configured to implement a recurrent neural network including an input layer, an output layer, and at least one hidden layer. Each layer of the input layer, the output layer, and the at least one hidden layer includes at least one neuron.

A respective neuron may be configured to: receive one or more inputs; apply a weighting to a respective input; determine a sum of the weighted inputs; apply a transfer function to the sum of the weighted inputs; and provide a result of applying the transfer function to the sum of the weighted inputs as an output.

A recurrent neural network may be an artificial neural network, where connections between neurons form a cyclic or acyclic directed graph along a sequence. A recurrent neural network may include an internal state or memory, enabling the recurrent neural network to process sequences of input data such as an input signal including a plurality of readings.

The input layer may include a plurality of input neurons, where each input neuron of the plurality of input neurons is associated with a respected input point according to the method.

The output layer may include an output neuron associated with the response point according to the method.

A respective hidden layer may include internal neurons that ray increase a machine learning capability and/or artificial engine of the recurrent neural network.

There is at least one hidden layer. In one embodiment, a number of hidden layers may be five.

According to a further embodiment, the neurons of the input layer and the output layer are each configured with a linear activation function, and the neurons of the at least one hidden layer are each configured with a sigmoid-shaped activation function.

For example, the sigmoid-shaped function may be a hyperbolic tangent function.

According to a further embodiment, the recurrent neural network is a long short-term memory.

A long short-term memory (LSTM) flay be a recurrent neural network including a plurality of LSTM units. Each LSTM unit may include, as artificial neurons, a cell, an input gate, an output gate, and a forget gate. Implementing a LSTM may beneficially improve the ability of the neural network device to learn and predict complex behaviors of the mechanical system.

According to a further embodiment, total number of neurons of the recurrent neural network is between 10 and 250.

In one embodiment, and as a non-limiting example, the number of neurons may be 100.

Any embodiment of the first aspect or the second aspect may be combined with any embodiment of the first aspect or the second aspect to obtain another embodiment of the first aspect or the second aspect.

According to a third aspect, the present embodiments relate to a computer program product including a program code for executing the above-described method for detecting vibrational and/or acoustic transfers in a mechanical system when run on at least one computer.

A computer program product, such as a computer program means, may be embodied as a memory card, USB stick, CD-ROM, DVD, or as a file that may be downloaded from a server in a network. For example, such a file may be provided by transferring the file including the computer program product from a wireless communication network.

According to a fourth aspect, an apparatus for detecting vibrational and/or acoustic transfers in a mechanical system including a plurality of mechanically interacting elements is provided. The provided apparatus includes a neural network device and further includes an acquisition unit configured to: a) while the mechanical system is operated according to an operating pattern, acquire, at each input point of a plurality of input points of the mechanical system, an input signal indicative of a mechanical load acting on the input point during operation; and acquire, at a response point of the mechanical system, a response signal indicative of a mechanical response of the mechanical system at the response point. The apparatus also includes a training unit, configured to b) train the neural network device using the input signals acquired at the plurality of input points as training input data and using the response signal acquired at the response point as training output data. The apparatus includes a prediction unit configured to: for each input point of the plurality of input points, c) provide only the input signal acquired at the respective input point as input data to the trained neural network device; and d) obtain, as output data from the trained neural network device in response to only the input signal acquired at the respective input point being provided thereto, a contribution signal indicative of a predicted contribution of the input signal acquired at the respective input point to the response signal acquired at the response point.

The embodiments and features described with reference to the method according to the first aspect apply mutatis mutandis to the apparatus of the fourth aspect.

According to a fifth aspect, an apparatus for detecting vibrational and/or acoustic transfers in a mechanical system including a plurality of mechanically interacting elements is provided.

The apparatus includes a trained neural network device that, is trained to perform detection of vibrational and/or acoustic transfers in the mechanical system, and further includes: an acquisition unit configured to, a') while the mechanical system is operated according to an operating pattern, acquire, at each input point of a plurality of input points of the mechanical system, an input signal indicative of a mechanical load acting on the input point during operation, and acquire, at a response point of the mechanical system, a response signal indicative of a mechanical response of the mechanical system at the response point. The apparatus also includes a prediction unit configured to, for each input point of the plurality of input points: c) provide only the input signal acquired at the respective input point as input data to the trained neural network device; and d) obtain, as output data from the trained neural network device in response to only the input signal acquired at the respective input point being provided thereto, a contribution signal indicative of a predicted contribution of the input signal acquired at the respective in put point to the response signal acquired at the response point.

The embodiments and features described with reference to the method according to the second aspect apply mutatis mutandis to the apparatus of the fifth aspect.

A respective entity, such as the neural network device, the acquisition unit, the training unit, and/or the prediction unit may be implemented in hardware and/or in software. If the entity is implemented in hardware, the entity may be embodied as a device (e.g., as a computer or as a processor or as a part of a system, such as a computer system). If the entity is implemented in software, the entity may be embodied as a computer program product, as a function, as a routine, as a program code, or as an executable object.

Further possible implementations or alternative solutions of the present embodiments also encompass combinations, which are not explicitly mentioned herein, of features described above or below with regard to the embodiments. The person skilled in the art may also add individual or isolated aspects and features to the most basic form of the present embodiments.

DETAILED DESCRIPTION

Figure 1:
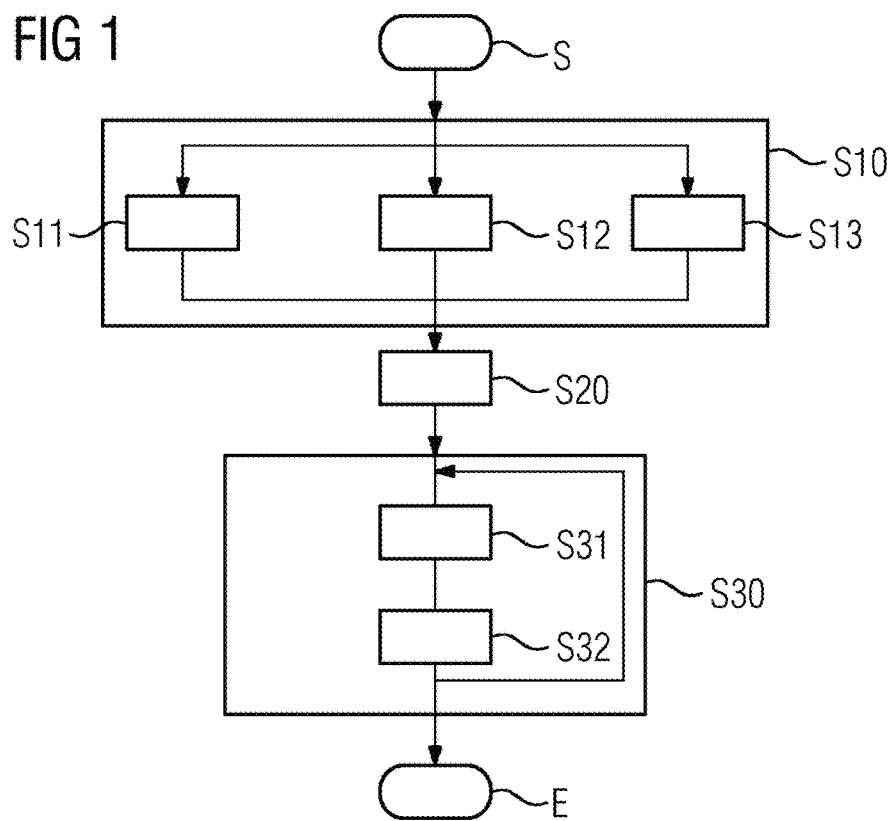
FIG. 1 shows a method for detecting vibro-acoustic, transfers in a mechanical system according to a first exemplary embodiment.

In the figures, like reference numerals designate like or functionally equivalent elements, unless otherwise indicated. First, an example of a mechanical system including a plurality of interacting mechanical elements will be briefly described with reference to FIG. 2.

Figure 2:
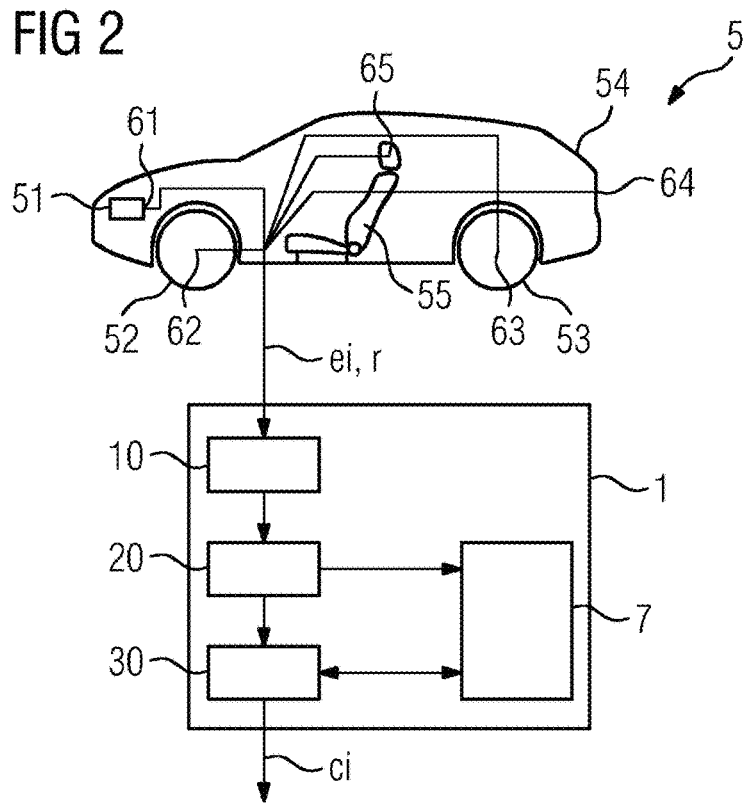
FIG. 2 shows an apparatus for detecting vibro-acoustic transfers in a mechanical system according to the first exemplary embodiment.

FIG. 2 shows, inter alia, a prototype car 5 (e.g., a "car" hereinbelow) as one possible example of the mechanical system. For example, the car 5 includes a plurality of mechanically interacting elements, such as, for example, a motor 51, a front wheel 52, a rear wheel 53, a back door 54, and a seat 55.

When the car 5 is driven on a road or a test stand (not shown), acoustic and/or vibrational mechanical loads may act upon the mechanical system 5 at a plurality of excitation sources. Specifically, vibrations of the motor 51 (e.g., primary excitation source), vibrations caused by rotation of the wheels 52, 53 and/or by mechanical interaction between the wheels 52, 53 and the road or test stand (not shown), or by a rattling door such as the back door 54 and the like (e.g., secondary excitation sources) may be input to the mechanical system 5.

These acoustic and/or vibrational mechanical loads input to the mechanical system 5 may be transferred through the car 5 along a variety of structural and/or air-borne transfer paths and may ultimately reach a passenger sitting in the seat 55. The passenger may experience an unpleasant noise, vibrational, or harshness (NVH) sensation.

During design of the prototype car 5, it may be desirable to know to which amount each of the excitations sources 51, 52, 53, 54 contribute to the NVH sensations. The proposed method and apparatus may be beneficially used to provide the required information to enable proper corrective action.

FIG. 1 shows one embodiment of a method for detecting vitro-acoustic transfers in the mechanical system 5 shown in FIG. 2 according to a first exemplary embodiment. In FIG. 1, rectangles denote method acts, and arrows denote a sequence of execution of the method acts.

FIG. 2 shows, next to the car 5, an apparatus 1 for detecting vitro-acoustic transfers in the mechanical system according to the first exemplary embodiment. In FIG. 2, rectangles illustrate respective entities, unit devices, and/or apparatuses, and arrows illustrate a signal flow.

The first exemplary embodiment will be described with reference to both FIG. 1 and FIG. 2.

The apparatus 1 of FIG. 2 includes an acquisition unit 10, a training unit 20, a prediction unit 30, and a neural network device 7.

As the method starts (S), in act S10 of the method illustrated in FIG. 1, operational data is acquired from the car 5.

More specifically, in act S11, the car 5 is operated according to an operating pattern. According to one variant, the car 5 may be driven on a road (not shown) and an operating parameter, such as a rotations per minute (rpm) value of the motor 51, may be recorded in predetermined time intervals and stored in association with time as the operating pattern. According to another variant, the car 5 may be operated on a test stand (not shown) according to a predetermined operating pattern.

While the car 5 is being operated in this manner, in act S12, the acquisition unit 10 of the apparatus 1 acquires a plurality of input signals e± from a plurality of input points 61-64 located in the car 5.

Herein, each of the input points 61-64 may be located at or near a respective one of the primary excitation source 51 and the plurality of secondary excitation sources 52-54. A respective input signal e± is a signal indicative of a mechanical load acting on the mechanical system 5 at the respective input point (e.g., one of 61-64).

A respective input signal e± may be a force signal, an acceleration signal, an acoustic or vibrational signal, a noise signal, a strain signal and pray be acquired using a force sensor, an accelerometer, a microphone, a strain gauge, or the like (not shown) placed at a respective input point (e.g., one of 61-64).

At the same time, while the car 5 is being operated according to act S11 and the input signals e± are acquired according to act S12, the acquisition unit 10 also acquires a response signal r from a response point 65 located in the car 5.

Specifically, the response point may be located at or near a location where a passenger experiences an unpleasant NVH sensation, such as at a head rest of the seat 55.

Also, the response signal r may be a force signal, an acceleration signal, an acoustic or vibrational signal, a noise signal, a strain signal and may be acquired using a force sensor, an accelerometer, a microphone, a strain gauge, or the like placed at the response point 65.

The acquisition unit 10 provides the plurality of input signals e± and the response signal r to the training unit 20.

In act S20 of the method illustrated in FIG. 1, the training unit 20 trains the neural network device 7 using the acquired operational data of the mechanical system 5 so as to cause the neural network device 7 to learn the behavior of the mechanical system 5.

More specifically, the training unit S20 provides the plurality of input signals e± as training input data to the neural network device 7 and also provides the response signal r as training output, data to the neural network device 7, to train the neural network device 7.

The training unit 20 provides the plurality of input signals e± and the response signal r to the prediction unit 30.

In act S30, the prediction unit 30 uses the neural network device 7 to obtain a plurality of contribution signals c± indicative of a predicted contribution of the input signal e± acquired at the respective of the input points 61-64 to the response signal r acquired at the response point 65.

More specifically, acts S31 and S32 are executed once for each input point of the plurality of input points 61-64.

In act S31, the prediction unit 30 provides only the input signal e± acquired at the respective input point (e.g., one of 61-64) as input data to the trained neural network device 7.

In response to providing only the input signal e± acquired at the respective input point (e.g., one of 61-64) to the trained neural network device 7 in act S31, the prediction unit obtains, in act S32, output data from the trained neural network device 7. From the output data obtained in this way, the prediction unit 30 forms a contribution signal c±.

A respective contribution signal c± obtained in this way is considered to be indicative of a predicted contribution of a respective input signal e± to the response signal r. A predicted contribution of a respective input signal e± to the response signal r may also be referred to as a portion or amount of the respective input, signal e± that is transferred through the mechanical system 5 and becomes part of the response signal r at the response point 65.

The plurality of contribution signals c± is provided as an output of the method of FIG. 1 and the apparatus 1 of FIG. 2, and the method ends (E). Conceptual details of further developments of the first exemplary embodiment will now be described with reference to FIGS. 3-6.

Figure 3:
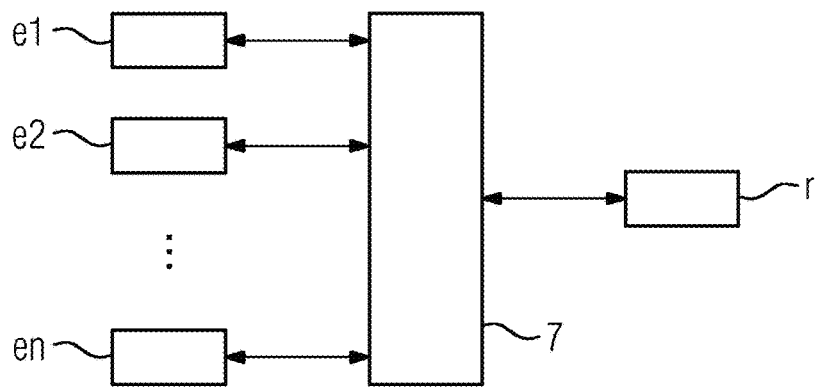
FIG. 3 is a block diagram illustrating conceptual details of act S20 of FIG. 1.

FIG. 3 is a block diagram illustrating conceptual details of act S20 of FIG. 1 and FIGS. 4, 5, and 6 are block diagrams illustrating conceptual details of act S30 of FIG. 1.

Specifically, in act S20 (FIG. 1), as is shown in the block diagram in FIG. 3, the neural network device 7 is trained using the plurality of acquired input signals $e_1, e_2, \ldots, e_n$, as training input data and using the acquired response signal r as training output data.

The training may be carried out as supervised training including a forward pass and a reverse pass, as illustrated by the bijective arrows in FIG. 3.

Specifically, each of input signals $e_1, e_2, \ldots e_n$ and the response signal r may be split into a plurality of corresponding portions of predetermined length. The predetermined length may be between 100 and 1000 readings. A respective set including a corresponding portion of the predetermined length of each of the input signals $e_1, e_2, \ldots e_n$ and the response signal may also be referred to as a batch.

During a forward pass of the supervised training, for each of the batches, the corresponding portions of each of the input signals $e_1, e_2, \ldots e_n$ are provided to the neural network device 7 as training input data, and output data obtained from the neural network device 7 in response to the training input data is compared to the corresponding portion of the response signal of the batch. Weightings applied by respective neurons of the neural network device 7 are adjusted so as to reduce a deviation between the output data obtained from the neural network device 7 and the corresponding portion of the response signal r of the batch. During a backward pass of the supervised training, for each of the batches, the corresponding portion of the response signal r is provided to the neural network device 7 as training output data, the neural network device 7 is operated in a reverse manner, and training input data obtained from the neural network device 7 in response to the training output data is compared to the corresponding portions of the input signals $e_1, e_2, \ldots e_n$ of the batch. Weightings applied by the respective neurons of the neural network device 7 are adjusted so as to reduce a deviation between the input data obtained from the neural network device 7 and the corresponding portions of the input signals $e_1, e_2, \ldots e_n$ of the batch.

After a forward pass and a backward pass have been completed for each of the batches, one epoch of training is completed.

A respective signal e1, e2, ... en, r may include a number of readings, and each reading may be associated with an operating parameter used at the time of acquisition of the respective reading for operating the mechanical system 5 according to the operating pattern in step S11.

Along with each reading, a respective associated operating parameter may be provided to the neural network device 7 as part of the training input data and/or the training input data. Thereby, the neural network device 7 may learn the behavior of the mechanical system 5 under different operating conditions defined by the operating parameters.

Act S20 may proceed to repeat the training acts described above to complete a predetermined number of epochs and/or until convergence of respective deviations between the training output data and the response signal r (e.g., forward pass) and between the training input data and the plurality of input signals e1, e2, ... en is attained. In this manner, a trained neural network device 7 may be obtained.

Specifically, in act S30 (FIG. 1), acts S31 and S31 are repeated for each of the plurality of input points for each of the plurality of input signals e1, e2, ... en).

Figure 4:
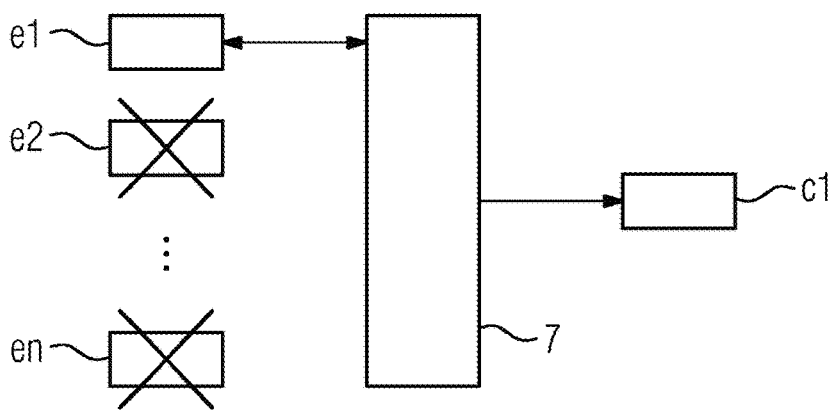
FIGS. 4, 5, and 6 are block diagrams illustrating conceptual details of act S30 of FIG. 1.

Specifically, in a first iteration in the loop of S30 shown in FIG. 1, only the input signal e1 is provided to the trained neural network device 7 in act S31 (FIG. 1), as is shown in FIG. 4. Input signals e2, ... en are not provided to the trained neural network device 7. From the output data obtained from the trained neural network device 7 in response to the input signal ei in act S32 (FIG. 1), a contribution signal Ci is formed. The contribution signal ci is considered to be a prediction of a contribution of the input signal ei acquired at a corresponding input point (61 in FIG. 2) to the response signal r acquired at the response point (65 in FIG. 2).

Figure 5:
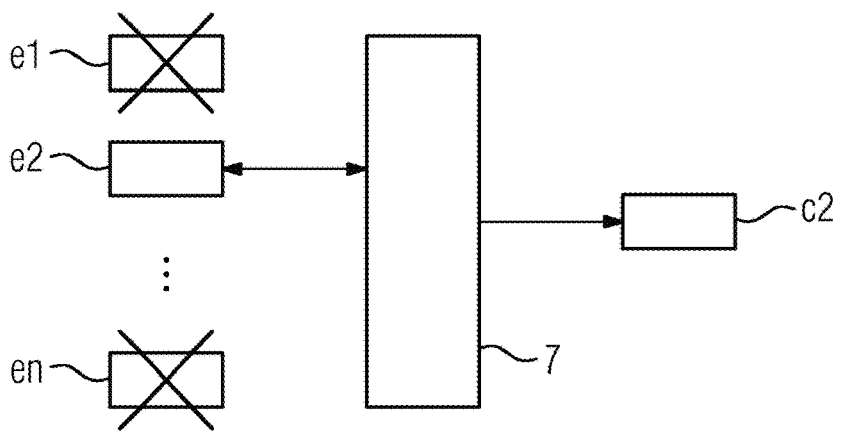

Next, as is shown in FIG. 5, only the input signal e2 is provided to the trained neural network device 7. From the output data obtained from the trained neural network device 7 in response to the input signal e2, a contribution signal c2 indicative of a predicted contribution of the input signal e2 to the response signal r is formed.

Acts S31 and S32 (FIG. 1) are repeated in this manner for each of the input signals e±.

Figure 6:
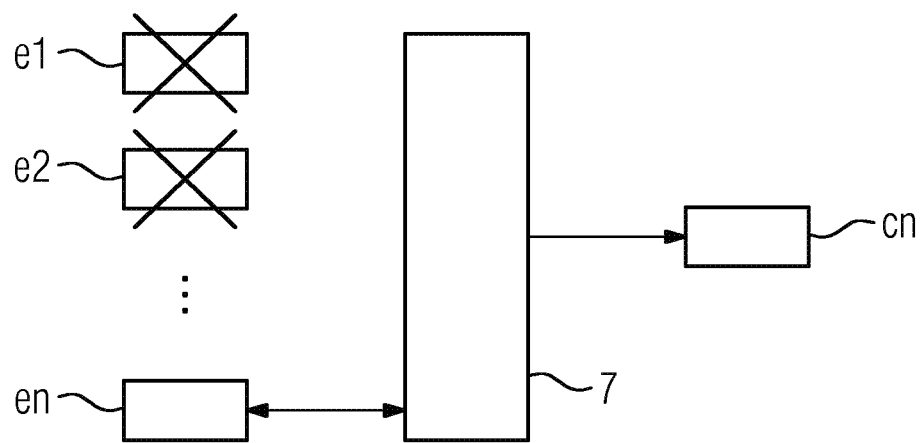

As is shown in FIG. 6, only the input signal en is provided to the trained neural network device 7. From the output data obtained from the trained neural network device 7 in response to the input signal en, a contribution signal en indicative of a predicted contribution of the input signal en to the response signal r is formed. Merely in order to facilitate understanding, act S30 (FIG. 2) may also be described in the following way, where reference is made to FIGS. 2 to 6:

The trained neural network device 7 may be used to predict, for each of the input points 61-64, a behavior of the mechanical system 5 in a hypothetical situation in which a mechanical load is acting only on a respective single input point (e.g., one of 61-64). Herein, the output data provided by the neural network device in each of FIGS. 4-6 may be considered to be a respective predicted hypothetical response signal predicted to be generated in the mechanical system 5 at the response point 65 when the mechanical system 5 is hypothetically excited only by the respective single input signal e1, e2, ... en at the respective single input point (e.g. one of 61-64).

By using the neural network device 7 in this manner to predict the behavior of the mechanical system 5 in a hypothetical situation in which a mechanical load is acting only on a respective single one of the input points 61-64, transfers of mechanical loads in the mechanical system 5 may be favorably detected without taking recourse to conventional transfer path analysis (TPA).

Disadvantages of TPA such as complex calculations and having to partly disassemble the mechanical system 6 to be able to carry out an excitation test may be overcome.

Figure 7:
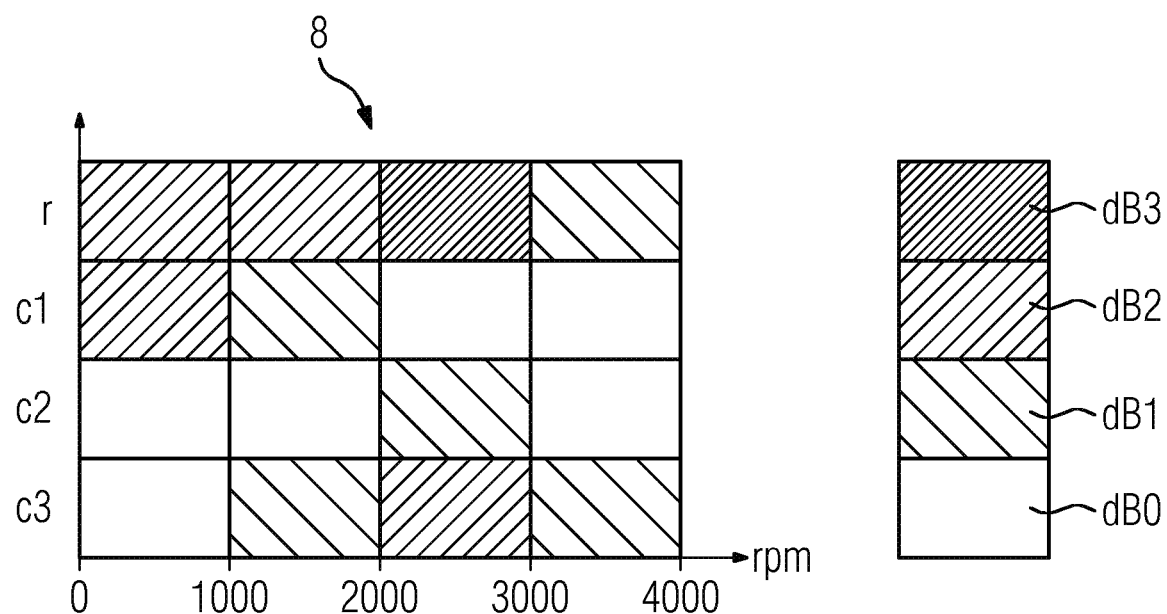
FIG. 7 shows a graphical decomposition of a response signal into a plurality of contribution signals according to a development of the first exemplary embodiment.

FIG. 7 shows an exemplary graphical decomposition 8 of the response signal r into a plurality of contribution signals c1, c2, c3 according to a development of the first exemplary embodiment.

The development will be described with reference to FIG. 7 and FIG. 2.

According to the development, the apparatus 1 may be configured to generate a digital representation of a graphical decomposition from the response signal r and the plurality of contribution signals c1, c2, c3. The apparatus 1 may include and/or be connected to a display device (not shown). In response to being supplied with the digital representation, the display device (not shown) may display a digital representation similar to the exemplary digital representation 8 shown in FIG. 7.

In the exemplary graphical decomposition 8 shown in FIG. 7, an operation parameter such as a number of rotations per minute is plotted on the horizontal axis. Respective signals r, c1, c2, c3 are shown on top of each other along the vertical axis. An empty rectangle denotes low vibro-acoustic load (db0) of a respective signal in a respective operating parameter range. A hatched rectangle denotes medium vibro-acoustic load (db1). A cross-hatched rectangle denotes high vibro-acoustic load (db2). A triple-hatched rectangle denotes very high vibro-acoustic load (db3). The vibro-acoustic load may be in units of decibels in one example.

As shown in FIG. 7, the response signal r acquired at the response point 65 indicates high or very high vibro-acoustic load over a wide operating parameter range from 0 to 3000 rpm. A counter-measure to improve an NVH experience at the response point 65 is to be provided.

As also shown in FIG. 7, the contribution signals c1, c2, and c3 constitute a decomposition of the response signal r. In other words, a respective portion of the response signal r may be rep resented as a sum of corresponding (same position along the horizontal axis) portions of the contribution signals c1, c2, c3.

The exemplary decomposition 8 includes information that, according to the prediction made by the neural network device 7, a highest contribution to the response signal r in the operating parameter range from 0 to 1000 rpm is the contribution ci of an input signal ei acquired at a first input point (such as near the first input point 61 at the motor 51). Accordingly, a countermeasure may be taken in the operating parameter range from 0 to 1000 rpm at the first input point 61.

The exemplary decomposition 8 further includes information that the contribution c3 of an input signal e3 acquired at a third input point 63 (e.g., the rear axis next to the rear wheel 53), to the response signal r is high in the operating parameter range from 2000 to 3000 rpm. Accordingly, a countermeasure may be taken in the operating parameter range from 2000 to 3000 rpm at the third input point 63.

A respective countermeasure may include altering the mechanical system 5 at the respective input point (e.g., one of 61-64). For example, a stiffness may be increased in an area of the input point 61, 63, a damper element may be arranged, or a design of the mechanical system 5 may be altered to alter a location of the respective input point 61, 63 and; or a transfer path between the respective input point 61, 63 and the response point 65.

The respective countermeasure may be taken manually by an engineer or automatically, based on the contribution signals c± output by the apparatus 1, by a design assistance device (not shown).

According to a further development, the apparatus 1 may output the contribution signals c± to a design assistance device or the like so as to cause altering the mechanical system 5 without generating the graphical decomposition 8.

Figure 8:
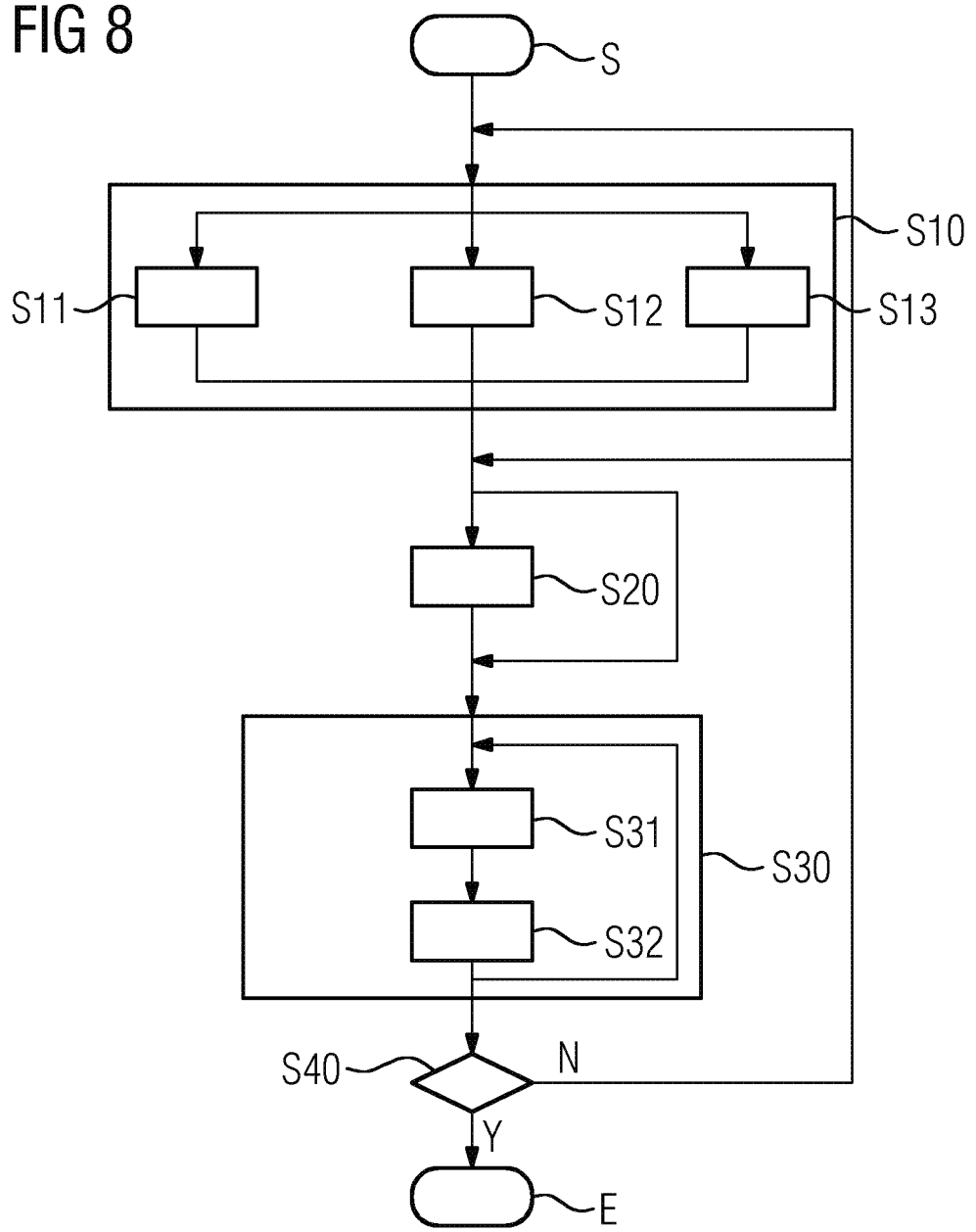
FIG. 8 shows a method for detecting vibro-acoustic transfers in a mechanical system according to a second exemplary embodiment.
Figure 9:
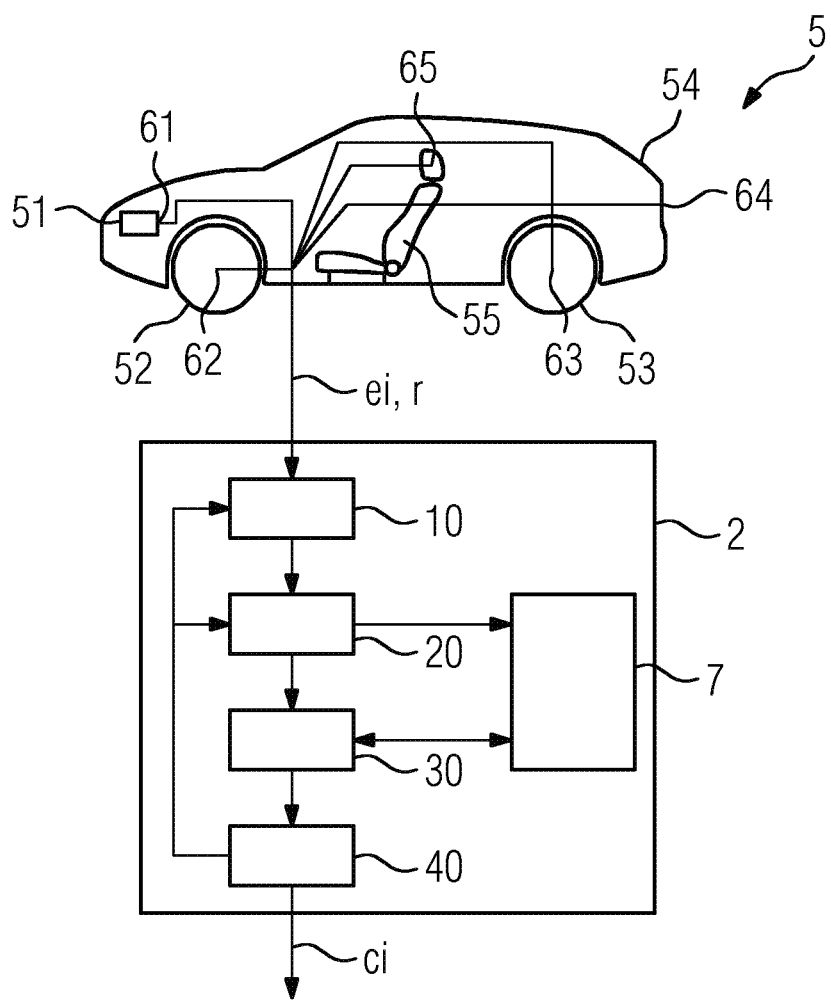
FIG. 9 shows an apparatus for detecting vibro-acoustic transfers in a mechanical system according to the second exemplary embodiment.

FIG. 8 shows a method for detecting vibro-acoustic transfers in a mechanical system 5 according to a second exemplary embodiment, and FIG. 9 shows a corresponding apparatus 2 according to the second exemplary embodiment.

The second exemplary embodiment resembles the first exemplary embodiment, and like reference numerals designate like elements. Only differences between the second exemplary embodiment and the first exemplary embodiment are described below with reference to FIG. 8 and FIG. 9.

The apparatus 2 according to the second exemplary embodiment also includes a testing unit 40. The testing unit 40 is configured to execute act S40 of the method of the second exemplary embodiment after the plurality of contribution signals c± have been obtained according to acts S10-S30 in a manner similar to the first exemplary embodiment.

In act S40, the testing unit 40 determines a sum of the plurality of contribution signals c±. In other words, the testing unit 40 determines a sum signal, where each reading is obtained by adding corresponding readings of each of the contribution signals c±. The testing unit 40 then proceeds to subtract the sum signal from the response signal r to obtain a result signal. The testing unit 40 calculates a root mean square value of the result signal.

If the root mean square value is below a predetermined threshold, the testing unit 40 determines that the neural network device 7 is sufficiently trained. Otherwise, the testing unit 40 determines that the neural network device 7 is not sufficiently trained.

In other words, and merely to facilitate understanding, with reference to FIG. 7, the testing unit 40 may verify whether the contribution signals c1, c2, c3 correctly add up to the response signal r. If the contribution signals c1, c2, c3 do not correctly add up to the response signal r, the prediction made by the neural network device is not accurate, which may indicate the neural network device 7 is not sufficiently trained.

When it is determined by the testing unit 40 in act S40 that the neural network device 7 is not sufficiently trained, the testing unit 40 notifies the training unit 20 that the neural network device 7 is not sufficiently trained.

After that, according to one variant, the method returns to act 20 to repeat training using the same input signals e± and the same response signal r previously acquired in order to perform a more intense training of the neural network device 7 using the same training input data and training output data as in a previous execution of act S20.

According to another variant, when it is determined that the neural network device 7 is not sufficiently trained, the testing unit 40 returns to act S10. In other words, operating of the mechanical system 5 is repeated in act S11 according to the same or a different operating pattern to acquire further operational data. After that, act S20 is repeated to perform more training of the neural network device 7 using the newly acquired operational data as training input data and training output data.

When it is determined by the testing unit 40 in act S40 that the neural network device 7 is sufficiently trained, the testing unit 40 notifies the training unit 20 that the neural network device 7 is sufficiently trained, and the method ends E.

According to the present exemplary embodiment, when the method according to FIG. 8 is repeated in entirety using the same mechanical system 5 and the same neural network device 7 using the same or a different operating pattern, act S20 may be obviated/omitted (e.g., no training according to act S20 may be performed) when the training unit 20 has been notified that the neural network device 7 is sufficiently trained.

When further operational data (e.g., a second plurality of input signals e± and a second response signal r) is acquired while operating the car 5 using a second operating pattern that differs from the operating pattern used while training the neural network device 7, operating conditions that were not experienced during the previous training act S20 may be experienced. The neural network device 7 may be able to obtain contribution signals ci indicative of a predicted contribution of the respective of the second plurality of input signals e± during the operation condition that was not experienced during training, and advantageously without requiring further training.

Figure 10:
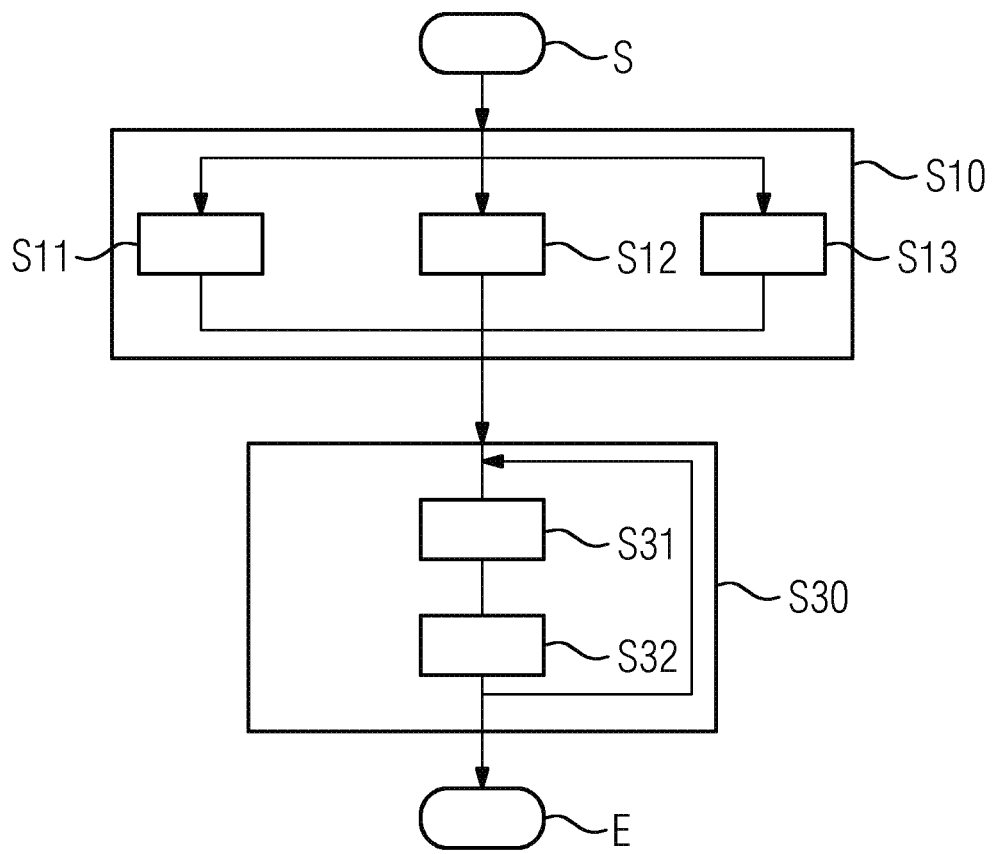
FIG. 10 shows a method for detecting vibro-acoustic transfers in a mechanical system according to a third exemplary embodiment.
Figure 11:
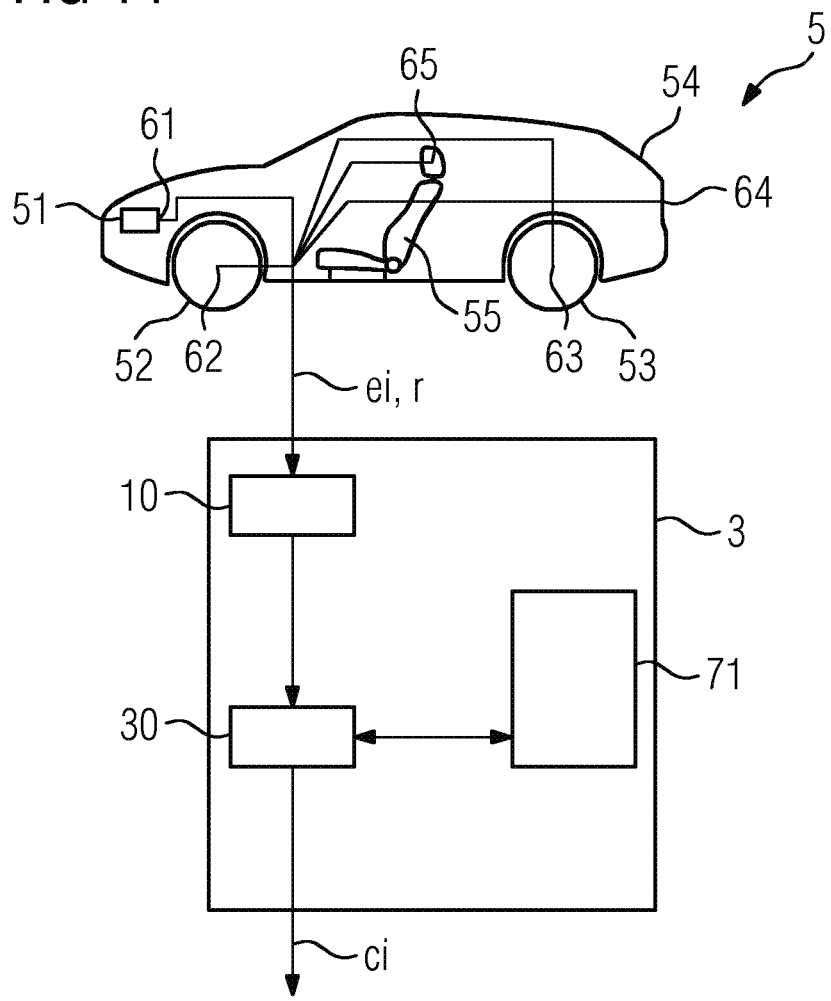
FIG. 11 shows an apparatus for detecting vibro-acoustic transfers in a mechanical system according to the third exemplary embodiment.

FIG. 10 shows a method for detecting vitro-acoustic, transfers in a mechanical system 5 according to a third exemplary embodiment, and FIG. 11 shows a corresponding apparatus 3 according to the third exemplary embodiment.

The third exemplary embodiment resembles the first exemplary embodiment, and like reference numerals designate like elements.

With reference to FIG. 10 and FIG. 11, the third exemplary embodiment differs from the first exemplary embodiment in that the apparatus 3 includes a previously trained neural network device 71 and does not include a training unit (e.g., 20 in FIG. 2). Correspondingly, the method shown in FIG. 10 does not include a training act (e.g., S20 in FIG. 2).

The trained neural network device 71 may be a neural network device that has been previously trained using acts such as acts S10 and S20 (FIG. 2) of the method according to the first or second exemplary embodiment.

The trained neural network device 71 may be installed in the car 5. As has been discussed for the first and second exemplary embodiments, the trained neural network device 71 may have artificial knowledge about mechanical transfers of the mechanical system of the car 5. This knowledge may be used to enable various functionality of the car 5. For example, the trained neural network device 71 may be used to control an audio system, a noise cancelling system, and the like of the car 5 also in unforeseen operating conditions that were not encountered during a design phase of the car 5.

A practical exemplary use case of the exemplary embodiments will be briefly discussed.

An apparatus 1, 2 for detecting vibrational and/or acoustic transfers in a prototype car 5 was built.

The neural network device 7 of the apparatus 1, 2 was configured to implement a recurrent neural network. The recurrent neural network included several layers of artificial neurons, and, for example, an input layer, an output layer, and five hidden layers. For example, the recurrent neural network was configured as a long short-term memory. The neurons of the input layer and of the output layer were configured with a linear activation function. The neurons of the five hidden layers were configured with a sigmoid-shaped, hyperbolic tangent activation function. A dropout of 0.2 was implemented between each layer. A total number of neurons of the LSTM was 100.

The prototype car was operated according to an operating pattern including 5 run-up operations runs, all on 4th gear at 50% throttle. Respective input and response signals were acquired, each including 27136 readings.

The neural network device 7 was trained in hatches of 1000 readings. Convergence was obtained in less than 1000 epochs.

Contribution signals $c_±$ of individual input signals $e_±$ and a predicted response signal for the plurality of input signals $e_±$ were determined using both a method according to the embodiments and using conventional transfer path analysis (TPA). A useful level of agreement between the two approaches was confirmed.

Although the present invention has been described in accordance with exemplary embodiments, it is obvious for the person skilled in the art that modifications are possible in all exemplary embodiments.

In the exemplary embodiments, supervised training has been described as a method of training the neural network device 7. However, an unsupervised training method may be used instead.

A car 5 has been described as an example of the mechanical system 5. However, the present invention may also be useful in applications in aviation engineering, machinery engineering, and the like.

The graphical decomposition 8 shown in FIG. 7 is merely an example. The graphical decomposition 8 may include a different, such as a larger, quantity of operating ranges and a different (e.g., larger) quantity of contribution signals $c_±$. Other ways of visualizing the contribution signals $c_±$ may be used for the graphical decomposition 8, such as a plurality of graphs, plots, pie charts, and the like.

It is understood that a respective neural network device is implemented to receive a plurality of input signals and to generate a plurality of output signals after being trained, where the output signals are generated employing artificial intelligence acquired through the before-mentioned training processes. The input and output signals may include encoded data referring to or representing physically observable quantities. In embodiments, such quantity is a mechanical or vibrational load, a frequency, or another mechanical stimulus to the mechanical system and/or a measure for an NVH contribution. In embodiments, input and or output signals are generated and transmitted through a network, and the content of the signals are stored at least temporarily by respective memory devices.

The disclosed embodiments of methods and devices allow for an efficient transfer path analysis in car or vehicle design automation.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for detecting vibrational, acoustic, or vibrational and acoustic transfers in a mechanical system including a plurality of mechanically interacting elements, the method comprising:
   while operating the mechanical system according to an operating pattern, acquiring, at each input point of a plurality of input points of the mechanical system, an input signal indicative of a mechanical load acting on the respective input point during operation, and acquiring, at a response point of the mechanical system, a response signal indicative of a mechanical response of the mechanical system at the response point;
   training a neural network device using the input signals acquired at the plurality of input points as training input data and using the response signal acquired at the response point as training output data; and
   for each input point of the plurality of input points:
      providing only the input signal acquired at the respective input point as input data to the trained neural network device; and
      obtaining, as output data output from the trained neural network device in response to only the input signal acquired at the respective input point being provided thereto, a contribution signal indicative of a predicted contribution of the input signal acquired at the respective input point to the response signal acquired at the response point.

2. The method of claim 1, further comprising:
   testing the trained neural network device, the testing of the trained neural network device comprising:
      determining a sum of the plurality of contribution signals;
      subtracting the sum of the plurality of contribution signals from the response signal;
      determining that the neural network device is sufficiently trained when a result of the subtraction is less than a predetermined threshold; and
      otherwise, determining that the neural network device is not sufficiently trained.

3. The method of claim 1, wherein the training is supervised training comprising:
   providing the training input data to the neural network device, such that predicted output data is obtained; and
   adjusting weightings applied by respective neurons of the neural network device such as to reduce a deviation between the predicted output data and the training output data.

4. The method of claim 1, wherein the training of the neural network device comprises:
   splitting the input signals and the response signal into a plurality of batches of predetermined length; and
   for each batch of the plurality of batches, training the neural network device using respective portions of the input signals as the training input data and a respective portion of the response signal as the training output data.

5. The method of claim 1, further comprising:
   while operating the mechanical system according to a second operating pattern different from the first operating pattern, acquiring, at each input point of the plurality of input points, a second input signal, and acquiring, at the response point of the mechanical system, a second response signal; and performing the providing and the obtaining using the second input signals as the input signals and the second response signal as the response signal.

6. The method of claim 1, further comprising generating and displaying a decomposition of the response signal into the predicted contributions of the input signals acquired at each input point of the plurality of input points.

7. The method of claim 1, further comprising:
comparing the predicted contributions of the input signals acquired at each input point of the plurality of input points;
identifying an input signal the predicted contribution of which is greatest among the plurality of predicted contributions; and
altering the mechanical system at the input point at which the identified input signal has been acquired.

8. The method of claim 1, wherein the neural network device is configured to implement a recurrent neural network comprising an input layer, an output layer, and at least one hidden layer, each layer of the input layer, the output layer, and the at least one hidden layer comprising at least one neuron.

9. The method of claim 8, wherein the neurons of the input layer and the output layer are each configured with a linear activation function, and the neurons of the at least one hidden layer are each configured with a sigmoid-shaped activation function.

10. The method of claim 8, wherein the recurrent neural network is a long short-term memory.

11. The method of claim 8, wherein a total number of neurons of the recurrent neural network is between 10 and 250.

12. A method for detecting vibrational, acoustic, or vibrational and acoustic transfers in a mechanical system including a plurality of mechanically interacting elements using a trained neural network device trained to perform detection of vibrational, acoustic, or vibrational and acoustic transfers in the mechanical system, the method comprising:
while operating the mechanical system according to an operating pattern, acquiring, at each input point of a plurality of input points of the mechanical system, an input signal indicative of a mechanical load acting on the respective input point during operation, and acquiring, at a response point of the mechanical system, a response signal indicative of a mechanical response of the mechanical system at the response point;
for each input point of the plurality of input points:
providing only the input signal acquired at the respective input point as input data to the trained neural network device; and
obtaining, as output data from the trained neural network device in response to only the input signal acquired at the respective input point being provided thereto, a contribution signal indicative of a predicted contribution of the input signal acquired at the input point to the response signal acquired at the response point, wherein training of the neural network device uses the input signals acquired at the plurality of input points as training input data and using the respese signal acquired at the response point as training output data, and for each input point of the plurality of input points.

13. An apparatus for detecting vibrational, acoustic, or vibrational and acoustic transfers in a mechanical system including a plurality of mechanically interacting elements, the apparatus comprising:
a neural network device;
an acquisition unit configured to:
while the mechanical system (5) is operated according to an operating pattern, acquire, at each input point of a plurality of input points of the mechanical system, an input signal indicative of a mechanical load acting on the respective input point during operation, and acquire, at a response point of the mechanical system, a response signal indicative of a mechanical response of the mechanical system at the response point;
a training unit configured to train the neural network device using the input signals acquired at the plurality of input points as training input data and using the response signal acquired at the response point as training output data; and
a prediction unit configured to, for each input point of the plurality of input points:
provide only the input signal acquired at the respective input point as input data to the trained neural network device; and
obtain, as output data from the trained neural network device in response to only the input signal acquired at the respective input point being provided thereto, a contribution signal indicative of a predicted contribution of the input signal acquired at the respective input point to the response signal acquired at the response point.

14. An apparatus for detecting vibrational, acoustic, or vibrational and acoustic transfers in a mechanical system including a plurality of mechanically interacting elements, the apparatus comprising a trained neural network device that is trained to perform detection of vibrational, acoustic, or vibrational and acoustic transfers in the mechanical system, the apparatus comprising:
an acquisition unit configured to, while the mechanical system is operated according to an operating pattern, acquire, at each input point of a plurality of input points of the mechanical system, an input signal indicative of a mechanical load acting on the respective input point during operation, and acquire, at a response point of the mechanical system, a response signal indicative of a mechanical response of the mechanical system at the response point;
a prediction unit configured to, for each input point of the plurality of input points:
provide only the input signal acquired at the respective input point as input data to the trained neural network device; and
obtain, as output data from the trained neural network device in response to only the input signal acquired at the respective input point being provided thereto, a contribution signal indicative of a predicted contribution of the input signal acquired at the respective input point to the response signal acquired at the response point,
wherein training of the neural network device uses the input signals acquired at the plurality of input points as training input data and using the response signal acquired at the response point as training output data, and for each input point of the plurality of input points.

* * * * *